Patented Apr. 7, 1953

2,634,291

UNITED STATES PATENT OFFICE 2,634,291

PRIMARY AND SECONDARY ALKYL SULFENYL TRITHIOCARBONATES

Philip M. Arnold, Bartlesville, Okla., assignor to Phillips Petroleum Company, a corporation of Delaware No Drawing. Application November 13, 1951, Serial No. 256,119

3 Claims. (Cl. 260—545)

The present invention relates to a new class of organic sulfur compounds, and more particularly to novel compounds having the general formula

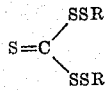

in which R is a primary or secondary alkyl group. The new compounds are the primary and secondary dialkyl sulfenyl trithiocarbonates, and are derivatives of trithiocarbonic acid, $H_2CS_3$, in which the hydrogen atoms have been replaced by the alkyl sulfenyl groups, RS—, wherein S is connected with the the alkyl group at a primary or a secondary carbon atom.

The new compounds of the present invention may be prepared by the reaction of an alkali trithiocarbonate with a primary or secondary alkyl sulfenyl halide in accordance with the equation

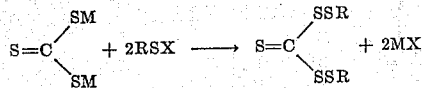

where M is sodium or other alkali metal, R is a primary or secondary alkyl radical, and X is chlorine or other halogen. The reaction may be carried out at room temperature or at somewhat higher temperatures, preferably in the presence of a suitable inert solvent such as a paraffin hydrocarbon. In general, it is preferred that R be a primary or secondary alkyl radical having from 1 to 12 carbon atoms, in order to give products having a preferred chain length and molecular weight.

The primary and secondary alkyl sulfenyl halides are readily prepared by halogenation of primary or secondary alkyl mercaptans or disulfides, care being taken to avoid simultaneous halogenation of the alkyl group. The alkali trithiocarbonates are prepared by the reaction of an alkali metal sulfide with carbon disulfide.

The new compounds in question are of particular interest as lubricating oil additives, rubber vulcanization agents, and as flotation agents in the separation of ores. They also can be employed in polymerization recipes wherein synthetic elastomers are produced. These novel primary and secondary compounds have good defoliation properties, and show some nematocidal activity. The use of the new compounds disclosed and claimed herein as nematocides is set forth in detail and claimed in the copending application of Roy E. Stansbury et al., Serial No. 323,509, filed December 1, 1952, for Trithiocarbonates as Nematocides.

The following examples are specific illustrations of the preparation of one of the novel compounds of this invention, but the procedure described therein may be considered as exemplary of that applicable to the preparation of the other members of the class of primary and secondary dialkyl sulfenyl trithiocarbonates described.

A solution of n-butylsulfenyl chloride in isopentane was prepared in a one liter, three necked flask equipped with a stirrer, a Dry-Ice cooled condenser, a heating mantle, and a chlorine inlet bubbler. Di - n - butyldisulfide and isopentane were charged to the flask using approximately 1200 ml. of isopentane per mol of disulfide. The solution was heated until the isopentane refluxed vigorously. The heating mantle was removed and agitation started. One mol of chlorine (71 grams) per gram mol of disulfide was added. The resulting normal butyl sulfenyl chloride solution was used immediately after preparation.

An aqueous solution of sodium trithiocarbonate was prepared by reacting sodium sulfide with carbon disulfide in the presence of water, as described in U. S. Patent 2,221,796. The solution was prepared in a one liter, three necked flask. The flask was equipped with a stirrer, a Dry-Ice cooled condenser, and provisions for conducting the reaction in a nitrogen atmosphere. Approximately one gram molecular weight of sodium sulfide nonahydrate and 100 ml. of water were charged to the flask. The slurry was stirred 20 minutes to saturate the water. Based on the sodium sulfide, a 10 per cent excess of carbon disulfide was added, and the reaction mixture was stirred approximately 16 hours at room temperature. As the reaction proceeded, the sodium sulfide gradually went into solution and the water phase changed from colorless to yellow and finally to deep red. After completing the reaction, the excess carbon disulfide was removed by heating the solution to 140° F., and the concentration of sodium trithiocarbonate in the resulting aqueous solution was calculated from the weight of carbon disulfide which had reacted. Based on the sodium sulfide charged, a 92 mole per cent yield of sodium trithiocarbonate was obtained.

Sodium trithiocarbonate was also prepared by the method of Yoeman, J. Chem. Soc., 119, 40 (1921), whereby sodium ethylate is converted to sodium hydrosulfide with hydrogen sulfide, and carbon disulfide is added to the alcoholic solution of sodium hydrosulfide to obtain the sodium trithiocarbonate. Using the literature procedure a 74 mol per cent yield (based on the sodium used) of the dry salt was obtained.

The reaction of normal butyl sulfenyl chloride with sodium trithiocarbonate was carried out in a one liter, three necked flask equipped with a stirrer, a Dry-Ice cooled condenser and a dropping funnel. After completing the addition of the two solutions, in each case, the two phase mixture was stirred vigorously for 30 to 60 minutes. The two phases were then separated, the water phase discarded, and the oil phase was washed with water and desiopentanized by heating to 130° F. at one mm. Hg pressure. In each case two mols of n-butyl sulfenyl chloride were used per mol of sodium trithiocarbonate.

It was found that rapid addition of n-butylsulfenyl chloride to the aqueous trithiocarbonate, or reverse addition (addition of trithiocarbonate to n-butylsulfenyl chloride) very significantly favored the reaction, indicating that the presence of an excess of the sulfenyl chloride in the reaction mixture is desirable.

*Reaction of n-butylsulfenyl chloride with sodium trithiocarbonate to form di-n-butylsulfenyl trithiocarbonate*

| Run No. | Method of Preparing Na₂CS₃ Solution | Conc. of Na₂CS₃ Sol. (Percent) | Mole Percent Yield of Crude Product | Index of Refraction of Crude Product ($n_D^{20}$) | Approximate Time of Adding Sulfenyl Chloride (Min.) |
|---|---|---|---|---|---|
| 1 | NaOC₂H₅+H₂S+CS₂ | 50 | 71.5 | 1.5230 | 30 |
| 2 ᵃ | Na₂S·9H₂O+H₂O+CS₂ | 36.6 | 91.7 | 1.5901 | (ᵇ) |
| 3 | Na₂S·9H₂O+H₂O+CS₃ | 36.6 | 93.7 | 1.5928 | 1 |

ᵃ Attempts to remove di-n-butyl disulfide, thought to be a possible impurity, from the crude product were unsuccessful. At a pot temperature of 275° F. (1 mm.) decomposition occurred, and there was essentially no overhead material.
ᵇ Trithiocarbonate added to sulfenyl chloride.

Analysis of crude di-n-butylsulfenyl trithiocarbonate from Run No. 3:

Percent Carbon:
  Calculated _____ 37.77
  Found _____ 37.90
Percent Hydrogen:
  Calculated _____ 6.29
  Found _____ 6.99
Percent Sulfur:
  Calculated _____ 55.94
  Found (by difference) _____ 55.11
Refractive Index, $n_D^{20}$ _____ 1.5928
Density, $d_{20}^{20}$ _____ 1.1316

In a similar manner, other primary and secondary alkyl sulfenyl trithiocarbonates may be prepared by the reaction of sodium trithiocarbonate with other primary and secondary alkyl sulfenyl chlorides. Examples are: methyl, ethyl, n-propl, isopropyl, isobutyl, sec-butyl, the various primary and secondary pentyl, hexyl, heptyl, etc., sulfenyl chlorides. Since the lower sulfenyl chlorides are more reactive, particularly those having 1 to 3 carbon atoms, it is desirable to use an anhydrous reaction medium and avoid the presence of water in the reaction mixture. Other alkali metal salts such as potassium, and other halides such as the fluoride and bromide may be used instead of the sodium salt and the chloride, respectively.

This application is a continuation-in-part of my copending application Serial No. 766,438 filed August 5, 1947, issued Nov. 13, 1951, as U. S. Patent 2,574,457, which claims the tertiary alkyl sulfenyl trithiocarbonates.

I claim:
1. An alkyl sulfenyl trithiocarbonate having the general formula

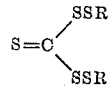

wherein R is an alkyl radical selected from the group consisting of primary and secondary alkyl radicals having no more than 12 carbon atoms.

2. A di(primary alkyl sulfenyl) trithiocarbonate having no more than 12 carbon atoms in each alkyl group.

3. Di-n-butylsulfenyl trithiocarbonate.

PHILIP M. ARNOLD.

REFERENCES CITED

The following references are of record in the file of this patent:

UNITED STATES PATENTS

| Number | Name | Date |
|---|---|---|
| 1,659,396 | Douglass | Feb. 14, 1928 |
| 2,574,457 | Arnold | Nov. 13, 1951 |